United States Patent
Dong et al.

(10) Patent No.: US 12,485,559 B2
(45) Date of Patent: Dec. 2, 2025

(54) SENSING IN CONTINUUM ROBOTS

(71) Applicant: ROLLS-ROYCE plc, London (GB)

(72) Inventors: Xin Dong, Nottingham (GB); Abdelkhalick Mohammad, Nottingham (GB); James Kell, Nottingham (GB); Dragos A Axinte, Nottingham (GB); Yihua Fang, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 220 days.

(21) Appl. No.: 18/227,182

(22) Filed: Jul. 27, 2023

(65) Prior Publication Data
US 2024/0051159 A1 Feb. 15, 2024

(30) Foreign Application Priority Data

Aug. 12, 2022 (GB) ..................... 2211789

(51) Int. Cl.
| | |
|---|---|
| *B25J 19/00* | (2006.01) |
| *B25J 9/06* | (2006.01) |
| *B25J 9/16* | (2006.01) |
| *B25J 19/02* | (2006.01) |

(52) U.S. Cl.
CPC ............ *B25J 19/023* (2013.01); *B25J 9/065* (2013.01); *B25J 9/1697* (2013.01)

(58) Field of Classification Search
None
See application file for complete search history.

(56) References Cited

U.S. PATENT DOCUMENTS

| | | | |
|---|---|---|---|
| 11,678,939 B2 * | 6/2023 | Row | A61B 34/20 606/1 |
| 2022/0202273 A1 * | 6/2022 | Ninni | A61B 34/30 |
| 2023/0255442 A1 * | 8/2023 | Masaki | A61B 1/00009 600/112 |
| 2024/0041550 A1 * | 2/2024 | Sitti | A61B 18/1445 |

FOREIGN PATENT DOCUMENTS

| | | | |
|---|---|---|---|
| CN | 108044599 A | 5/2018 | |
| CN | 108297079 A * | 7/2018 | ............ B25J 19/023 |
| DE | 10 2020 105384 A1 | 9/2021 | |
| KR | 20220027315 A * | 8/2020 | |
| KR | 10-2022-0027315 A | 3/2022 | |
| WO | 2019/210997 A1 | 11/2019 | |

OTHER PUBLICATIONS

Jan. 2, 2024 Extended Search Report issued in European Patent Application No. 23187312.6.
Jan. 3, 2023 Combined Search and Examination Report issued in British Patent Application No. 2211789.9.
(Continued)

*Primary Examiner* — James M Hannett
(74) *Attorney, Agent, or Firm* — Oliff PLC

(57) ABSTRACT

A sensing system for a continuum arm robot, the sensing system comprising at least one camera ring system mounted to the continuum robot, the camera ring system having at least two forward-facing cameras that face along the axis of the robot towards the tip.

14 Claims, 5 Drawing Sheets

(56) References Cited

OTHER PUBLICATIONS

Figure 1A:
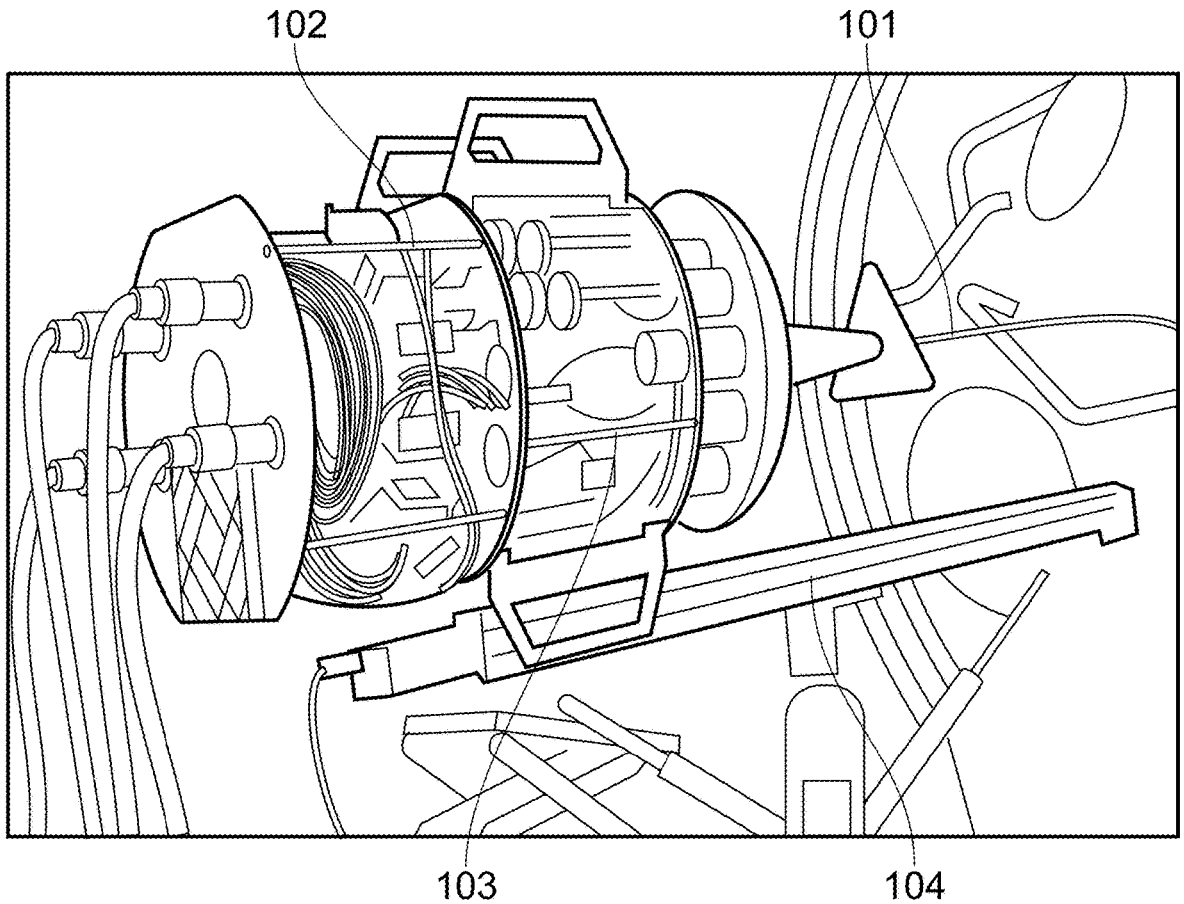

Melingui et al., "Adaptive Neural Network Control of a Compact Bionic Handling Arm," IEEE Transactions on Mechatronics, Dec. 2015, vol. 20, No. 6, pp. 2862-2875.

Melingui et al., "Neural Networks based approach for inverse kinematic modeling of a Compact Bionic Handling Assistant trunk," 2014 IEEE 23rd International Symposium on Industrial Electronics (ISIE), 2014, pp. 1239-1244.

Lee et al., "Nonparametric Online Learning Control for Soft Continuum Robot: An Enabling Technique for Effective Endoscopic Navigation," Soft Robotics, 2017, vol. 4, No. 4, pp. 324-337.

Wang et al., "Design and Development of a Slender Dual-Structure Continuum Robot for In-situ Aeroengine Repair," 2018 IEEE/RSJ International Conference on Intelligent Robots and Systems (IROS), Oct. 2018, pp. 5648-5653.

Yip et al., "Model-Less Feedback Control of Continuum Manipulators in Constrained Environments," IEEE Transactions on Robotics, Aug. 2014, vol. 30, No. 4, pp. 880-889.

Jakes et al., "Model-less Active Compliance for Continuum Robots using Recurrent Neural Networks," 2019 IEEE/RSJ International Conference on Intelligent Robots and Systems (IROS), Nov. 2019, pp. 2167-2173.

Frazelle et al., "Developing a Kinematically Similar Master Device for Extensible Continuum Robot Manipulators," Journal of Mechanisms and Robotics, Apr. 2018, vol. 10, pp. 025005-1-025005-8.

Fang et al., "Vision-Based Online Learning Kinematic Control for Soft Robots Using Local Gaussian Process Regression," IEEE Robotics and Automation Letters, Apr. 2019, vol. 4, No. 2, pp. 1194-1201.

Gerboni et al., "Feedback Control of Soft Robot Actuators via Commercial Flex Bend Sensors," IEEE/ASME Transactions on Mechatronics, Aug. 2017, vol. 22, No. 4, pp. 1881-1888.

Bilodeau et al., "Monolithic Fabrication of Sensors and Actuators in a Soft Robotic Gripper," 2015 IEEE/RSJ International Conference on Intelligent Robots and Systems (IROS), Sep.-Oct. 2015, pp. 2324-2329.

Ryu et al., "FBG-based Shape Sensing Tubes for Continuum Robots," 2014 IEEE International Conference on Robotics & Automation (ICRA), May-Jun. 2014, pp. 3531-3537.

FBGS, Tailored Fiber Optic Sensing Components & Solutions, <https://fbgs.com/>.

* cited by examiner

SENSING IN CONTINUUM ROBOTS

This specification is based upon and claims the benefit of priority from UK Patent Application Number 2211789.9 filed on 12 Aug. 2022, the entire contents of which are incorporated herein by reference.

BACKGROUND

Overview of the Disclosure

The disclosure relates to a means of visually sensing the position of a continuum robot. In particular, the disclosure relates to a ring camera system that is used to sense and determine the position of a continuum robot system.

BACKGROUND OF THE DISCLOSURE

Continuum arm or snake arm robots are of growing interest in a number of applications. This is because the robots can be manipulated into spaces in which other robotic systems or human operators can not readily access. This is due to the ability to manipulate the body with a number of degrees of freedom so that the end tool can be positioned accurately and easily. This positioning is controlled by actuators which manipulate the tendons within the robot so that each joint of the arm can be individually controlled with a high degree of positional accuracy.

Most continuum or snake arm robots have 6 degrees of freedom or less. However, if a task requires a greater amount of dexterity then the number of degrees of freedom required is increased. In such cases the number of degrees of freedom needs to be increased to 7-9. This increase in the number of degrees of freedom means that the arms are able to operate in confined areas, for example in maintenance of complex structures or for use in minimally invasive surgery. Continuum arm robots are designed along two main paths: Firstly, there are snake-like robots, which consist of multiple rigid-link sections that are connected by either rigid R/U/S (Revolute/Universal/Spherical) joints or by compliant joints. Each section is composed of one or more segments and controlled independently from the others with on-board or remote actuation. Secondly, there are continuum robots, which consist of a compliant backbone whose local and global deformation is controlled by one or more actuators.

However, one of the issues with the use of continuum robots is the difficulty in detecting the tip position. This limits the utility of the robots as knowing the position of the parts of a robot because tip control is key to being able to use the robots in confined spaces and in delicate or fragile areas as contact between the robot arm and the side could potentially result in damage. In the prior art string gauges have been installed at fixed positions on a robotic arm and then the readout from the gauges is used to measure changes in distance between the points. Form these measurements calculations can be performed to determine the location of the end-effector using geometry. In other examples the tip of a bionic arm was connected to the tip of a Kuka Robot and through using movement of the conjugated robots the time-domain Cartesian position of the tip could be provided from Kuka Control Software (KSS). However, these are complex systems that need to be calibrated in order to determine the position. Less complex ways are to use an electromagnetic (EM) position tracking system. In this case a tracking coil is attached to the distal tip of the robot arm and the position and orientation of the end-effector can be detected. Alternatively, vision-based-measurement-systems can be used, however, these require calibration, or they have limited accuracy. Consequently, there is a need to provide an improved accurate means of sensing and determining the position of a robot arm that does not require a lot of time-consuming calibration.

SUMMARY OF THE DISCLOSURE

According to a first aspect of the disclosure there is provided a sensing system for a continuum arm robot, the sensing system comprising at least one camera ring system mounted to the continuum robot, the camera ring system having at least two forward-facing cameras that face along the axis of the robot towards the tip.

There may be a further camera system mounted in the tip of the robotic arm.

There may be at least two camera ring systems mounted about the continuum arm robot, the camera rings having optical markers on the rear facing side of the camera ring system, which are in view of one or more of the forward facing cameras.

At least one of the camera ring systems may be provided with at least two side facing cameras that face substantially perpendicular to the axis that extends along the body of the continuum arm robot.

Each camera ring system may be provided with side facing cameras.

There may be two tip cameras.

The camera ring systems may be built into the robot.

The camera ring systems may be provided with a clamping mechanism so that the camera ring systems can be retroactively added to a continuum robot.

The camera ring system may have a thickness of between 2-10 mm.

There may be 2-6 forward facing cameras per ring system and 2-6 optical markers on the ring system.

The tip may be further provided with an LED illumination system.

At least one of the camera ring systems may be provided with an LED illumination system.

The sensing system may be coupled to a computer which is used to process the images from the camera system and to determine the shape and position of the continuum robot.

The images form the camera system can be displayed on a monitor output for the computer.

According to a second aspect of the disclosure there is provided continuum arm robot having the sensing system as discussed above.

According to a third aspect of the disclosure there is provided a method of operating a continuum arm robot having a sensing system according to the discussion above, the method comprising:
  inserting the continuum arm robot into the operating area,
  using the camera on the camera ring system to record images of the continuum arm robot operating within the operating area,
  processing the images to determine the shape of the continuum arm robot.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DISCUSSION OF THE FIGURES

Figure 1B:
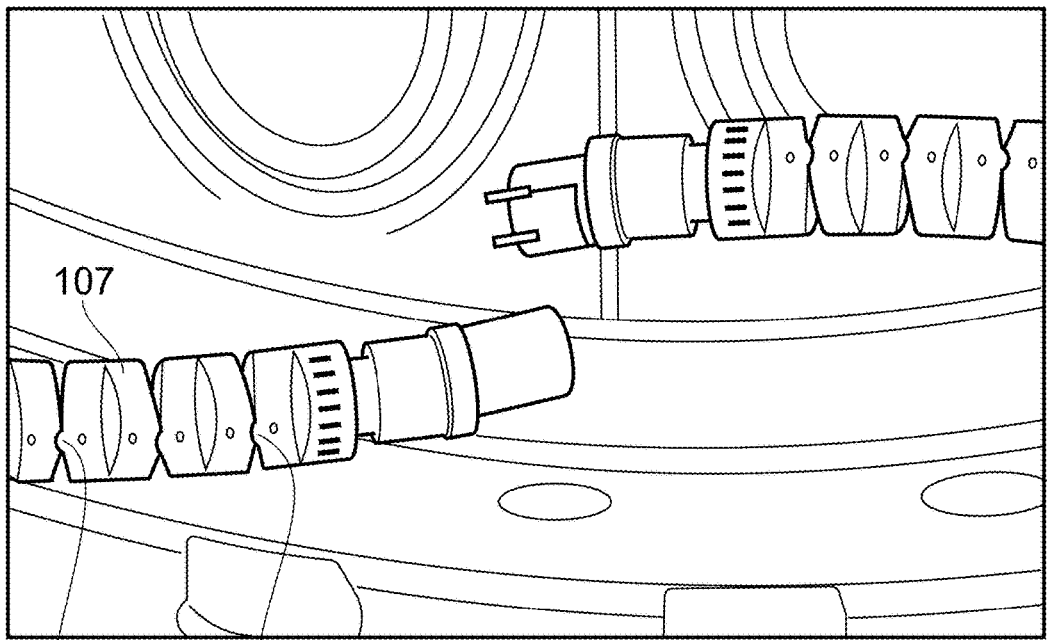
Figure 2:
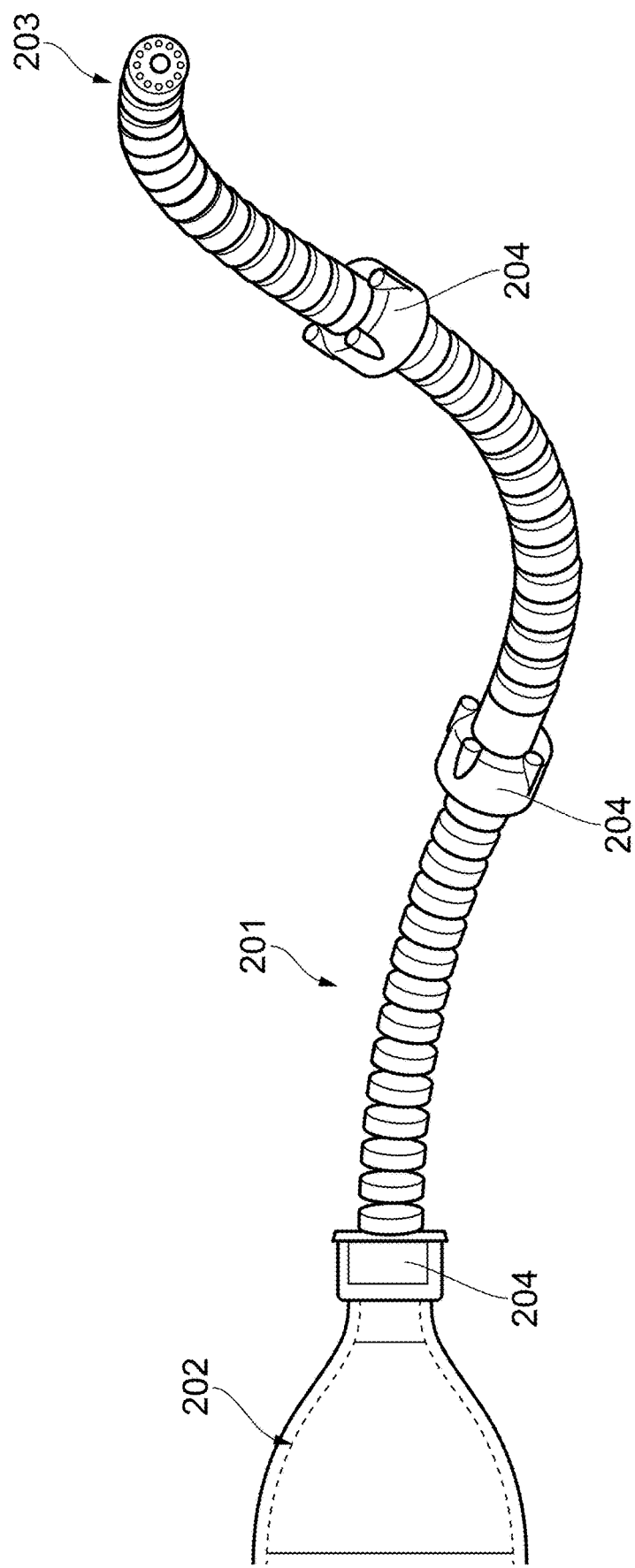
Figure 3:
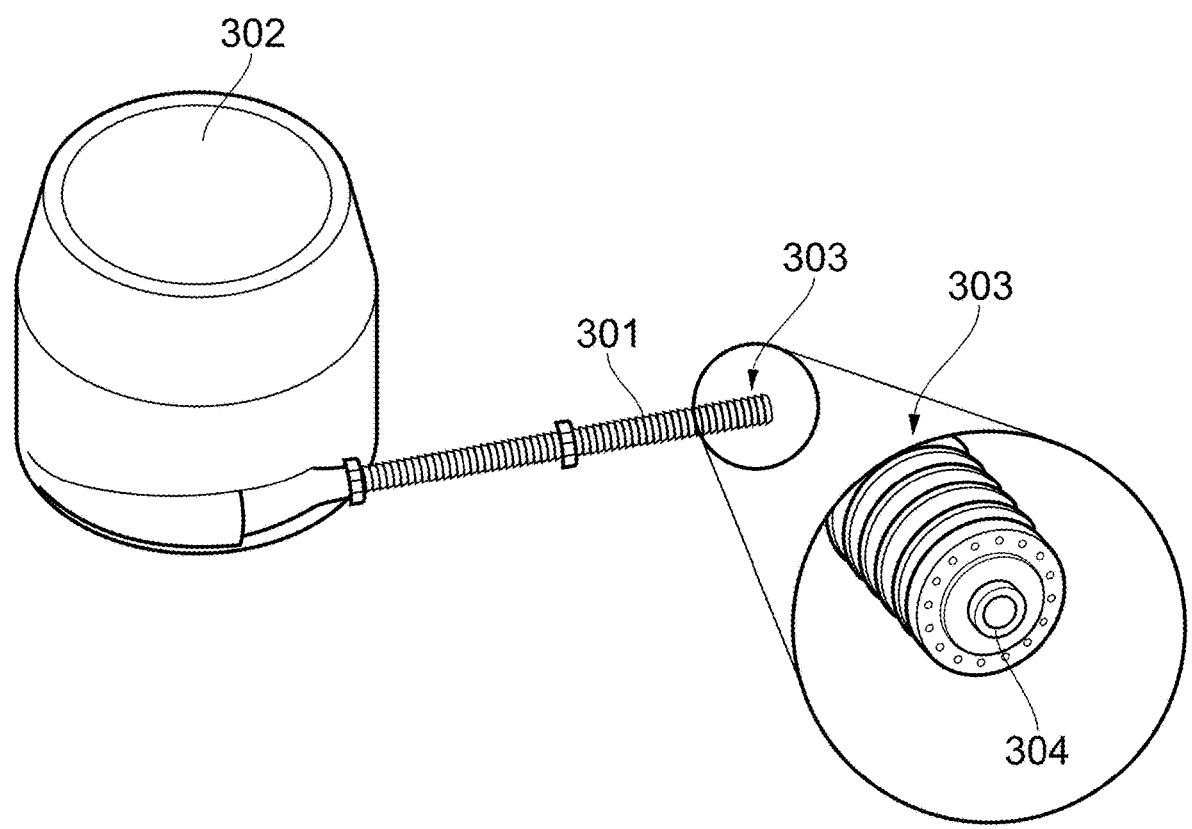
Figure 4:
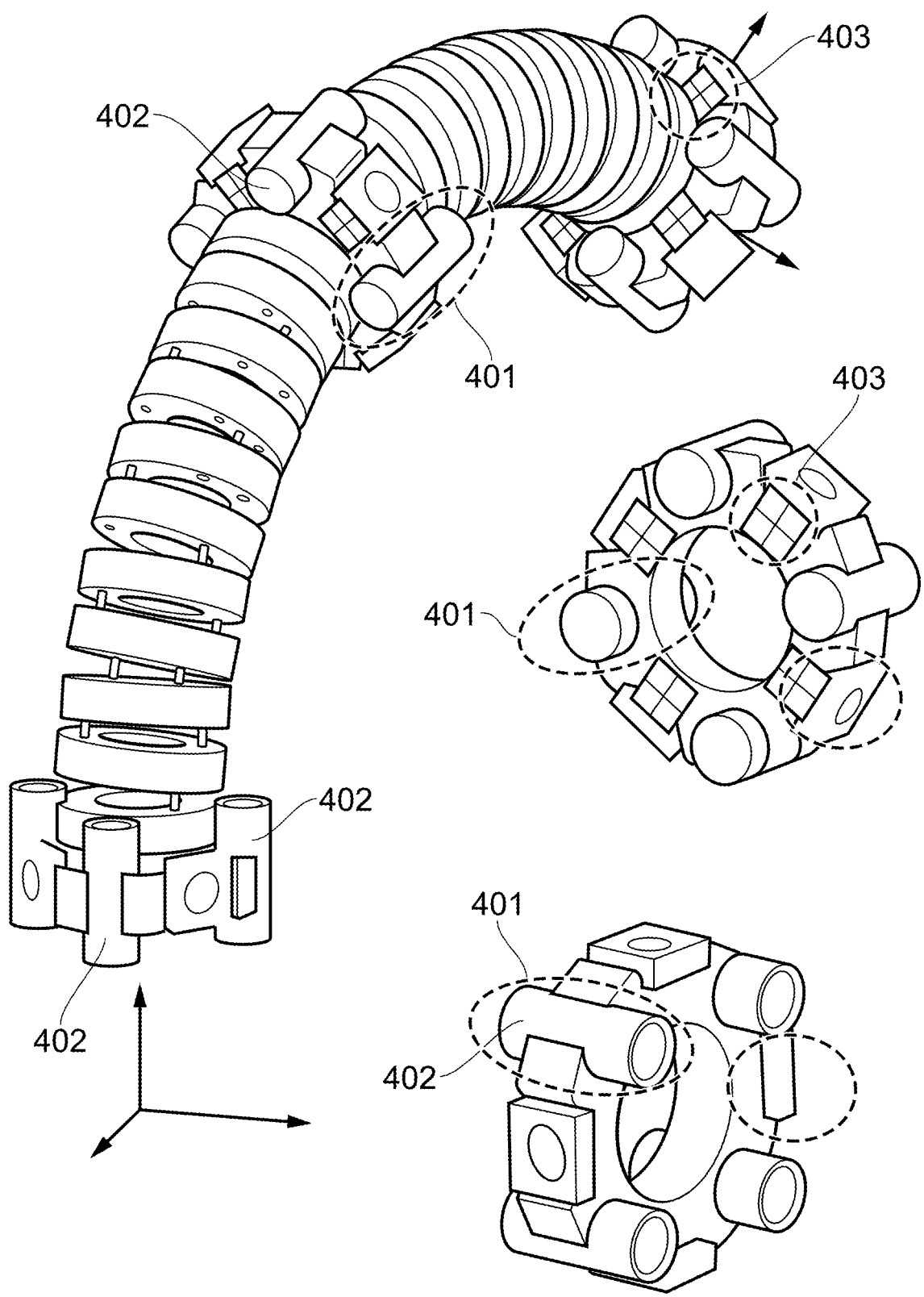
Figure 5:
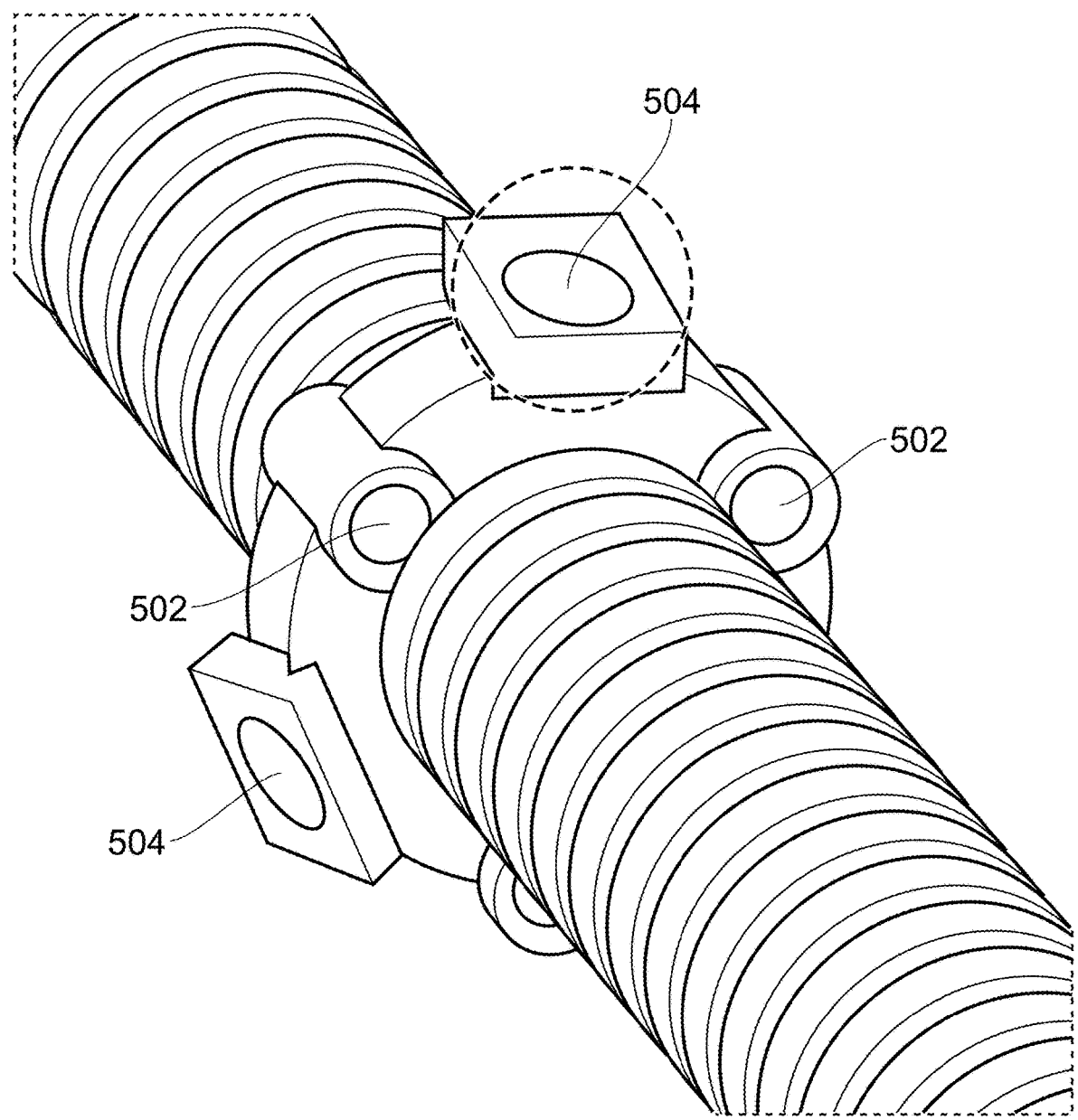

Embodiments will now be described by way of example only, with reference to the Figures, in which:

FIG. 1a presents a prior art example of a cut away of a continuum arm robot;

FIG. 1b presents an example of the joints of a continuum arm robot;

FIG. 2 presents an example of the robotic system according to the present disclosure;

FIG. 3 presents an example of the tip camera system according to the present disclosure;

FIG. 4 presents an example of the forward-facing cameras within the camera ring system according to the present disclosure; and FIG. 5 presents an example of the side-facing cameras within the camera ring system according to the present disclosure.

DETAILED DESCRIPTION OF THE DISCLOSURE

Aspects and embodiments of the present disclosure will now be discussed with reference to the accompanying figures. Further aspects and embodiments will be apparent to those skilled in the art.

FIG. 1a presents a prior art example of a cut away of a continuum arm robot. The prior art continuum arm robot comprises the continuum arm robot portion 101 permanently integrated and extending out from the actuator pack 102. The actuator pack 102 contains a plurality of independent actuators 103. These actuators are used to modulate the tension within the tendons that run through the continuum arm 101. The tendons are associated with joints within the arm; each of these joints are designed to move in response to a tensioning or relaxing of the tendon associated with the joint. This tensioning or relaxing of the tendon therefore causes a contraction or extension of the joint, which allows the continuum arm to bend. The actuator pack is shown as being positioned on a rail or support 104, which is positioned close to the component to be inspected. The actuator is also provided with a plurality of power and signal cables 105 that are used to power and address the actuators. The individual signals across the range of actuators provide control of the joints such that the continuum arm 101 can be directed. Not shown in FIG. 1 is that there is also a need for an operator with a computing device that is linked to the actuator to control movement of the continuum arm and to perform the desired task. The computing device that is connected to the prior art actuator may be any suitable computing system such as a laptop computer featuring the requisite operating software for the robot and a control input such as a joystick, which allows the continuum arm to be controlled.

FIG. 1b shows an example of the joints of a continuum arm robot. The arm comprises multiple joints, which require at least 2 cables per joint. For example, a system having three joints, each having 4 tendons per joint will require 12 actuators to drive. To increase the number of joints either the number of actuators needs to be increased or the number of tendons per joint needs to be reduced. Highlighted joints 106, 107, 108 are able to be manipulated to move in three dimensions. The joints are configured so that joints 106 and 108 are able to flex in the same plane relative to the centre of the arm, whilst the plane of joint 107 is able to move in is offset by 90° to joints 106 and 108. It is through this repeating configuration of alternating joint angles, each of which results in the movement in different orthogonal plane, that allows the arm to be manipulated in three dimensions. Each joint within the arm has a limit to the amount they are able to flex; this is defined by the design of the arm and the materials that are used. The limit of flex in each joint sets the characteristics of the arm such as the minimum bending radius and the requirements for the torque that is required to cause a resultant change within the joint. It is the presence of the space in the joints that allows the joint to move and the ease of movement of the joint that results in a low stiffness of the arms in comparison to other robotic arms of the same length. This is because the structural behaviour of a snake-like robotic manipulator can be compared to a cantilever beam under load; this is because the system is fixed on one end to the base with actuation pack and the remainder of the arm is used to navigate through the environment without other points of contact. In this condition, every load applied on the body and/or the tip of the snake-like robot, including its own weight, imposes a significant deflection from the ideal position. At the end of the arm there is positioned a tool or probe that is designed to perform one or more functions once the continuum arm is in position. The control cables for the tool, electrical power connectors are able to run through the centre of the joints within the continuum arm. This has the benefit of protecting the cables form any potential damage.

FIG. 2 presents a continuum arm robot having a vision-based sensing system according to an aspect of the present disclosure. The use of the camera-based system is a way of overcoming the issues associated with the prior art. This is because it provides a means of overcoming the issues of accurate real-time monitoring of the position of the robotic tip. The further advantage of this is that there are no requirements for pre-calibration of the robot, which can present issues with accuracy in cable-based systems. The continuum arm 201 is connected to an actuator mechanism 202. The actuator mechanism is used for controlling the actuator cables within the continuum robot. The imaging system for the continuum arm robot may comprise a forward-facing camera system 203 mounted to the continuum arm robot. The forward-facing camera system is positioned at the tip of the continuum arm robot and is responsible for observing the view along the axis of the body of the continuum robot. Akin to a snake the direction of the tip or head of the robot is regarded as forward facing. The imaging system for the continuum robot comprises at least one camera ring systems 204 mounted on the continuum robot. FIG. 2 shows the system having a plurality of such camera ring systems. The camera ring systems are responsible for vision along the body of the continuum robot. In addition to this they may be provided with optical markers so that the ring camera systems can record the position of the camera ring systems in front of them as they progress along the continuum robot from the actuator to the tip. This information may be used to accurately determine the shape of the robot at any given time. In addition, the information from the cameras may also be used to help detect and locate the continuum robot within the work environment. The camera ring systems may also be provided with sidewards facing cameras.

FIG. 3 presents a close-up example of the tip monitoring system according to the present disclosure. The robot arm 301 extends from the deployment mechanism 302. The tip section 303 features a camera system 304. The camera system may comprise one or more cameras. The cameras can be any suitable image sensor system. For example, this may be a charge coupled device chip or an active-pixel sensor, with either of these having their associated circuitry and lens systems. Alternatively, it may be part of a fibre optic-based camera system. Alternatively, the camera may be a LiDAR or infrared sensor. The camera may be positioned so that it is facing along the axis of the arm. Alternatively, the camera may be positioned to face at an angle relative to the axis of the continuum arm. If more than one camera is used as part of the camera system, then these can face in the same direction. Alternatively, the camera system may be configured so that one of the cameras faces along the axis of the robot arm and one of the cameras is angled relative to the axis. If the camera is angled relative to the axis this can be done at any suitable angle. For example, this may be between 60-120° relative to the axis. The tip camera system may work in conjunction with markers on the area of the workpiece to be investigated/worked. Additionally or alternatively, it can be used with known reference points within the workspace. The presence of these markers or known points are used such that the position of the tip can be accurately determined by an operator and/or a computer program. If more than one camera is used in the camera system techniques such as stereoscopic imaging may be used to determine the position and distance of the tip relative to a known point within the workspace.

FIG. 4 shows an example of the forward-facing vision system of the arm section of the robot according to the present disclosure. The camera ring system 401 is formed as part of a ring system; this can be built into the apparatus upon building of the robot. Alternatively, the camera ring system can be added to a robot arm retrospectively. Retrospective addition can achieved by securing the camera rings to the outer surface of the continuum arm robot at appropriate points along its length. Retrospective addition may be done through use of interlocking features on the robot and the ring. Alternatively, it may be performed via friction or compression by the ring body against the robot body. Compression or friction fitting may be achieved using a clamping mechanism. The clamping mechanism may be mechanical using a cam-style clamp, or a screw clamp. Alternatively, the clamping mechanism may be magnetic. The ring systems may be positioned at any suitable point. For example, this may be at the start of the active section and midway along the active section. Alternatively, this could be at the start of the active section and a second camera ring provided midway along the active section and a third camera ring close to the tip of the active section. The positioning of the rings will depend upon the number of camera rings being employed, the length of the active section as well as the required accuracy that is needed to be achieved by the system for accurate operation. By having a greater number of camera rings increases the accuracy of the position knowledge of the system. This is because it is able to more accurately determine the bend/curve of the robotic arm. The forward-facing camera rings may have two or more cameras 402 mounted on them. More preferably there are between 2-6 cameras on each camera ring. The cameras can be any suitable image sensor system. For example, this may be a charge coupled device chip or an active-pixel sensor either of these having their associated circuitry and lens systems. Alternatively, it may be part of a fibre optic-based camera system. Alternatively, the camera may be a LiDAR or infrared sensor. The cameras are mounted within protrusions from the ring. On the reverse side of the ring to the cameras are optical markers 403. The ring closest to the tip/actuator end of the arm may not have cameras, but just have the optical markers on it, so that it can be seen by the camera rings that are closer to the actuator.

FIG. 5 presents an example of the side facing camera system according to an example of the disclosure. The side facing cameras 504 are contained within the same ring as the forward-facing cameras 502. There may be two or more of the side facing cameras mounted on the ring. The side facing cameras are used to image the surroundings of the robot arm. The side facing cameras may by symmetrically disposed about the ring body. The presence of the cameras allows the robot operator to clearly see the area in which the robot is operating; this may prevent the robot from touching a side of the workspace or can help the operator steer the robot around a potential barrier or allow it to be accurately positioned to perform a desired task. The side facing cameras may be provided on all the camera ring systems. Alternatively, the side facing cameras may only be present on alternate camera ring systems. The cameras can be any suitable image sensor system. For example, this may be a charge coupled device chip or an active-pixel sensor either of these having their associated circuitry and lens systems. Alternatively, the camera may be a LiDAR or infrared sensor. If both forward and side facing cameras are present then the front-view probe cameras on body-ring provide feedback for the tip-position for each section against the base surface of this section. Whilst the side-view cameras on body-ring localize each tip are used to localise the robot within the working environment. These two measured values will correct each other, so as to obtain a serial measurement for tip position(s) for each section.

The camera system can be linked to a computer system that is able to process the images from the cameras. The computer system may be the same system that is connected to the actuator pack to control the continuum arm robot. The images from the cameras may be transmitted through cables that can run along the outside or the inside of the robot arm. Alternatively, the signal may be transmitted to the computer using a wireless signal. The computer may be provided with hardware for receiving the signals from the cameras mounted to the snake arms. The computer may be equipped with a computer program that is able to process the signals that are transmitted to the computer from the camera. The software may be able to process the distance between the optical markers and the camera. Using these determined distances and displacements between the cameras and the optical markers the program may calculate the curvature and bending of the arm of the robot. The curvature and bending of the robot arm can be used for either a controlled entry and performance of a task within a desired position. As such the arm can follow a known programmed series of movements so that it can get into the workspace and position itself to perform its task. The positional bending can also be used to trigger an alarm if the bend is greater than it should be for a given task. The computer program may also allow for real time viewing for the operator from the camera signals. The viewing could be for each of the cameras, or alternatively, the operator may select one or more of the camera image feeds to view.

The camera ring sensing system design provides a means for monitoring the arm shape of the robot, whilst simultaneously providing information on the tip position. The knowledge of the positions can be used to compensate for any error resulting from the theoretical models used in the control algorithms and random uncertainties. The body-camera-rings and tip cameras are also able to correct each other for more accurate measurements. The compact on-body structure with the camera ring that may protrude less than 10 mm from the outside diameter of the snake robot makes it possible for the snake to access confined space with a continuum robot and provide real-time, in-process shape/position information along the arm. Furthermore, compared with other high-resolution self-sensing solutions like Fiber Bragg Grating System sensors the probe camera is a relative economic solution.

Although, in the above-described examples the system is a continuum robot the same principle may be applied to borescopes or other manipulatable compliant arm robotic systems.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A sensing system for a continuum arm robot, the sensing system comprising at least one camera ring system mounted to the continuum robot, the camera ring system having at least two forward-facing cameras that face along the axis of the robot towards the tip,
    wherein there are at least two camera ring systems mounted about the continuum arm robot, the camera rings having optical markers on the rear facing side of the camera ring system, which are in view of one or more of the forward facing cameras.

2. The sensing system according to claim 1, wherein there is a further camera system mounted in the tip of the robotic arm.

3. The sensing system according to claim 1, wherein at least one of the camera ring systems is provided with at least two side facing cameras that face substantially perpendicular to the axis that extends along the body of the continuum arm robot.

4. The sensing system according to claim 3, wherein each camera ring system is provided with side facing cameras.

5. The sensing system according to claim 1, wherein there are two tip cameras.

6. The sensing system according to claim 1, wherein the camera ring systems are built into the robot.

7. The sensing system according to claim 1, wherein the camera ring systems are provided with a clamping mechanism so that the camera ring systems can be retroactively added to a continuum robot.

8. The sensing system according to claim 1, wherein the camera ring system has a thickness of between 2-10 mm.

9. The sensing system according to claim 1, wherein there are 2-6 forward facing cameras per ring system and 2-6 optical markers on the ring system.

10. The sensing system according to claim 1, wherein the tip is further provided with an LED illumination system.

11. The sensing system according to claim 1, wherein at least one of the camera ring systems are provided with an LED illumination system.

12. The sensing system according to claim 1, wherein the sensing system is coupled to a computer which is used to process the images from the camera system and to determine the shapea shape and position of the continuum robot.

13. A continuum arm robot having the sensing system according to claim 1.

14. A method of operating a continuum arm robot having a sensing system according to claim 1, the method comprising:
    inserting the continuum arm robot into an operating area,
    using the camera on the camera ring system to record images of the continuum arm robot operating within the operating area,
    processing the images to determine a shape of the continuum arm robot.

* * * * *